United States Patent Office 2,709,159
Patented May 24, 1955

2,709,159
ACTIVATING CARBON MONOXIDE CONVERSION CATALYST

Russell L. Daussat, Baton Rouge, La., assignor to Esso Research and Engineering Company, a corporation of Delaware No Drawing. Application October 27, 1949, Serial No. 123,980

6 Claims. (Cl. 252—470)

The present invention relates to the preparation of hydrogen by the reaction between a hydrocarbon, usually methane, and steam in the presence of a reformer catalyst to produce mixtures of $H_2$ and CO, and the treatment of this gaseous mixture with further quantities of steam in the presence of a carbon monoxide converter catalyst. More specifically, the present invention relates to an improved process for the preparation of a carbon monoxide converter catalyst wherein is obtained a catalyst having a more rugged nature and a higher activity than those hitherto produced.

In the manufacture of hydrogen by the reaction of steam with hydrocarbons at elevated temperatures, it is well known to carry out the process in two stages, wherein in the first stage, methane or other gaseous hydrocarbons are reacted with preferably an excess of steam in the presence of well-known reformer catalysts containing nickel, cobalt, etc. promoted with magnesia, alumina, thoria, and similar oxides, and supported, if desired, on an inert base. The temperatures usually employed are in the order of 1200°–1400° F. and higher, and as a result of the reaction, $H_2$ and CO are obtained. The reaction mixture is passed from the first stage to a second stage, which is operated at a much lower temperature, in the neighborhood of about 800° F., and further quantities of steam are generally added to the gas. In this stage the carbon monoxide produced in the first stage is converted to carbon dioxide and additional hydrogen in accordance with the water gas shift reaction, and the second stage is catalyzed by CO converter catalysts rich in iron oxide, such as iron oxide-chromic oxide catalysts, and it is to the improvements in the activities and physical properties of carbon monoxide converter catalyst that the present invention relates.

One of the problems associated with carbon monoxide converter catalysts is their tendency to be fragmented and crushed under the reaction conditions, resulting in formation of fines, dustiness, and other undesirable conditions, preventing their use under conditions of high gas velocities, thus seriously limiting plant throughputs.

The first steps in one customary process of preparing converter catalyst consist in impregnating iron oxide with a solution of a promoter, such as chromic nitrate to form a slurry, which is then heated in a furnace to drive off the water and to decompose the nitrates to oxides. The oxides are then wetted with water and extruded to the desired size. The pellets so formed are then dried in a steam oven to remove the moisture.

Converter catalysts prepared by the general process as outlined above posses a rather low crushing, or side strength. By side strength reference is had to a testing method wherein a pellet is laid on its side and the force necessary to crush and disintegrate the latter is determined. Steam dried pellets are found to have an average side strength of about 10 pounds, which is far too low for the catalyst to hold up under operating conditions. To be employable on a commercial scale, this side strength must be increased up to at least 45 pounds, and the higher the better.

Prior to the present invention, it has been found that the physical resistance to disintegration, as measured in terms of side strength, could be substantially increased by subjecting the steam dried catalyst to a roasting process in the presence of a stream of air. The effect of this roasting was not only to increase the strength of the catalyst but also to decompose completely, salts, such as nitrates. In general, the heat treatment was carried out for about 8 hours at about 1050° F. The table below indicates the effect of this heat treatment with air at increasing temperature levels, all carried out in periods of 8 hours.

| Temperature of Treatment in Air | Average Side Strength |
|---|---|
| 900° F | 20 |
| 1,000° F | 44 |
| 1,100° F | 57 |
| 1,200° F | 54 |
| 1,300° F | 55 |
| 1,600° F | 44 |

The above data indicate that a treating temperature of greater than 1000° F. and less than 1600° F. is necessary to produce catalyst of sufficient ruggedness.

It has also been found, however, as a result of much experimental and commercial plant operation that the activity of the converter catalyst, as measured in terms of percentage of CO in the exit gas from the CO conversion unit, decreases as the temperature of heat treatment increases, and the following table shows in a general way the manner in which this decrease takes place.

| Temperature of Treatment in Air | Percent of CO in Exit Gas |
|---|---|
| 950° F | 1.4–1.6 |
| 1,000° F | 1.6–1.7 |
| 1,100° F | 1.8–2.1 |
| 1,600° F | 2.6 |

Now when CO is present in the hydrogen leaving the converter and the hydrogen is employed in hydrogenation processes, the CO will be converted to $CH_4$. Because of the enormous quantities of hydrogen thus manufactured and thus employed, the methane concentration will rapidly build up to such a high degree that, in the hydrogenation process, some of the gas will continually have to be bled off that ordinarily would be recycled, and thus relatively small differences in CO content of the hydrogen gas feed to a hydrogenation process can have a very appreciable effect on the operating cost. For this reason, the importance of reducing the CO content even by as little as 0.1–0.3% of the total converter effluent cannot be overemphasized.

It is thus apparent that in accordance with prior art practice, a compromise must be effected between the higher catalyst treating temperatures favoring increased catalyst strength, and the lower temperatures favoring increased activity. In general, a temperature of 1050° F. is employed, resulting in an average side strength of 50 and an activity, as expressed in percent CO in effluent from the converter, of about 1.6 to 1.9.

It is, therefore, the principal object of the present invention to prepare very active carbon monoxide conversion catalysts in a form having much greater physical strength and showing a greatly decreased tendency towards dusting.

It is also an object of the invention to prepare conversion catalysts of high physical strength which do not require heat treating to an extent wherein their activity diminishes.

Other and further objects and advantages of the invention will appear from the description hereinafter.

It has now been found that high side strength may be imparted to the extruded and pelleted converter catalyst at considerably lower temperatures than has hitherto been found possible, by activating the extruded, dried, and pelleted material in an atmosphere of a gaseous hydrocarbon, such as natural gas, refinery gas, or methane. The volume of activating gas used may be suitably about 100 volumes per volume of catalyst per hour, but, much greater or less amounts may be used, as from 50 to 300 volumes. The activation period may vary from 5 to 10 hours, but preferably activation is carried out for about 8 hours. Because of the favorable results obtainable, activation may be carried out at 75°–300° F. lower than has hitherto been found possible when heat treatment was carried out in the presence of air, and in view of the above data on the relation between temperature of activation and catalyst activity it is at once apparent that the present invention offers distinct and marked advantages in employing the same in the carbon monoxide conversion process.

In order to illustrate the invention, below are set forth specific examples describing the improvement in the catalyst preparation and comparing the results obtained employing the improved catalyst with those obtained employing the customary air activated catalyst.

EXAMPLE I

A batch of CO conversion catalyst was prepared by impregnating in a mixer about 300 pounds of red iron oxide ($Fe_2O_3$) with 11.5 gallons of chromic nitrate (50% solution), and 5 gallons of water were added to make a slurry, which was conveyed to a Herreschoff furnace, wherein it was heated at about 900° F. In this stage, substantially all of the water is driven off and most of the nitrates are decomposed to oxides.

The resulting mixture consisting of about 93% iron oxide and 7% chromium oxide is then wetted with water in a mixer to facilitate extrusion, approximately 7 gallons water/300 pounds of oxides being required. After extrusion and pelleting, the pellets are dried with steam at about 300° F., to remove most of the moisture and to prevent cracking of the pellets on subsequent heating at higher temperatures. The steam-dried pellets are then activated in an atmosphere of air in an electric furnace for about eight hours at 1050° F. These are the time and temperatures required to decompose thoroughly all the nitrates and to make the pellets sufficiently strong, imparting an average side strength of about 50 pounds. The pellets after activation were screened to remove fines.

EXAMPLE II

CO conversion catalyst incorporating the improvements of the present invention was prepared by a process similar to Example I up to and including the steam drying step. Thereafter, the steam dried product was heated for 8 hours at 950° F. in a tube through which natural gas was passed at a rate of approximately 100 v./v./hr. At the end of the heating period the flow of natural gas was continued until the catalyst had cooled to room temperature before exposing it to the air.

EXAMPLE III

The following table indicates the considerably lower temperatures and shorter activation periods required to activate a given catalyst batch to a given level of catalyst strength.

| Batch | Air Activation | | | Methane Activation | | |
|---|---|---|---|---|---|---|
| | Time, Hrs. | Temp., °F. | Side Strength, Pounds | Time, Hrs. | Temp., °F. | Side Strength |
| a | 5 | 1,075 | 63 | 5 | 750 | 71 |
| b | 8 | 1,050 | 62 | 6 | 950 | 64 |
| c | 8 | 1,050 | 60 | 6 | 950 | 68 |
| d | 9 | 1,100 | 74 | 9 | 975 | 89 |
| e | 8 | 1,050 | 58 | 8 | 975 | 70 |

From the above table it is readily apparent that activation in an atmosphere of methane rather than air makes it possible to obtain a pellet of maximum strength at an activating temperature 75°–300° F. lower.

EXAMPLE IV

Catalyst prepared by both processes were tested for activity in a carbon monoxide conversion unit. As feed gas, CO, $CO_2$, $H_2$ and steam, representing the effluent from a prior methane conversion unit were employed.

*Comparison of activity of water gas shift catalyst: 7% $Cr_2O_3$; 93% $Fe_2O_3$*

| Catalyst Activation | Air | | Methane | |
|---|---|---|---|---|
| | A | B | C | D |
| Temperature | 1,025 | 1,100 | 950 | 900 |
| Time hrs | 8 | 8 | 8 | 4 |
| Vol. Catalyst cc | 200 | 45 | 200 | 45 |
| Catalyst Side Strength | | 50 | | 60 |
| Exit Gas, l./Hr | | 20 | | 20 |
| Steam, l./Hr | | 58 | | 58 |
| Exit Gas, v./v./Hr | 775 | 575 | 700 | 575 |
| Steam, v./v./Hr | 1,145 | 1,670 | 1,100 | 1,670 |
| Temp., °F | 898 | 825 | 900 | 825 |
| Feed Gas Composition: | | | | |
| Percent CO, Vol. Percent | 15.6 | 26.7 | 16.2 | 26.7 |
| Percent $O_2$, Vol. Percent | 0.5 | 0.3 | 0.3 | 0.3 |
| Percent $H_2$, Vol. Percent | 73.7 | 60.7 | 72.5 | 60.7 |
| Exit Gas: | | | | |
| Percent CO | 2.3 | 1.7 | 1.7 | 1.2 |
| Percent $CO_2$ | 18.2 | 30.5 | 18.3 | 30.1 |
| Percent $H_2$ | 75.4 | 67.8 | 75.8 | 68.7 |

In the table above, runs A and C, and runs B and D, were made under comparable conditions.

The above data clearly indicate the superior activity and physical properties of the conversion catalyst prepared in accordance with the present invention. Besides the examples cited, numerous other examples may be given.

EXAMPLE V

In order to determine whether the activation of the converter catalyst at relatively low temperatures to high side strength values was a property peculiar to hydrocarbon gases or possibly common to non-oxygen containing gases, steam dried catalyst prepared as described above was treated at elevated temperatures as shown below.

| Activation Atmosphere | Temperature, °F. | Time, Hrs. | Side Strength |
|---|---|---|---|
| Air | 900 | 6 | 30 |
| Nitrogen | 900 | 6 | 41 |
| Steam | 900 | 6 | 31 |
| Hydrogen | 900 | 6 | |
| Methane | 900 | 6 | 60 |

These results show that the relatively low temperature activation properties to give high side strength is peculiar to gaseous hydrocarbons, and not shared by inert gases. It was not found practicable to activate with gaseous hydrogen, as a pyrophoric product was obtained, indicating reduction of the oxides to metal.

Numerous modifications of the invention are readily apparent to those skilled in the art. Thus, though the examples have been restricted to an iron oxide-chromium oxide CO converter catalyst, it is obvious that other water gas shift catalyst, such as nickel, and promoters such as magnesia, alumina are susceptible to the same gaseous hydrocarbon activation process. Similarly, other hydrocarbon gases or gas mixtures besides methane may be employed for the activating process.

What is claimed is:

1. An improved process for activating catalysts promoting the water gas shift reaction which comprises treating an unactivated water gas shift catalyst comprising iron oxide in the form of shaped bodies at a temperature of from about 750° to 975° F. for a period of about 5 to 10 hours in an atmosphere consisting essentially of a hydrocarbon gas.

2. An improved process for the production of a catalyst adapted to catalyze the reaction between carbon monoxide and steam at temperatures between 800 and 950° F. to form $CO_2$ and $H_2$ which comprises forming an intimate mixture of the oxides of iron and chromium, forming the mixture into pellets, and heating the pellets in a hydrocarbon gas atmosphere at a temperature of not less than 750° F. and no greater than 975° F. for a number of hours to increase materially the mechanical strength of said pellets.

3. The process of claim 2 wherein said pellets consist essentially of 93% $Fe_2O_3$ and 7% $Cr_2O_3$.

4. The process of claim 2 wherein said hydrocarbon atmosphere consists essentially of methane.

5. An improved process for the production of a catalyst adapted to catalyze the water gas shift reaction which comprises forming an intimate mixture of the oxides of iron and chromium, forming said mixture into pellets and heating the pellets in contact with a gas comprising substantially methane at a temperature of not less than 750° F. and no greater than 975° F. for a number of hours to increase materially the mechanical strength of said pellets.

6. An improved process for the production of a catalyst adapted to catalyze the water gas shift reaction which comprises forming an intimate mixture of the oxides of iron and chromium, forming said mixture into pellets, passing said pellets into a catalyst activation zone, contacting said pellets with a gas comprising essentially methane at a temperature of not less than about 750° F. and no greater than about 975° F. for a number of hours, passing said gas through said activation zone at a throughput rate of about 50 to about 300 v./v./hr. and increasing materially the mechanical strength of said pellets.

References Cited in the file of this patent

UNITED STATES PATENTS

| | | |
|---|---|---|
| 2,106,597 | Ferguson | Jan. 25, 1938 |
| 2,369,432 | Byrns | Feb. 13, 1945 |
| 2,426,829 | Kearby | Sept. 2, 1947 |
| 2,461,147 | Davies et al. | Feb. 8, 1949 |
| 2,592,646 | Bell | Apr. 15, 1952 |